United States Patent
Schwetz et al.

(10) Patent No.: US 6,499,208 B2
(45) Date of Patent: Dec. 31, 2002

(54) DEVICE FOR PRODUCING POCKETS FOR PLATES AND FOR BATTERIES

(75) Inventors: Anton Schwetz, Ebersdorf (AT); Friedrich Ilgoutz, Ferlach (AT); Gunther Muller, Anger (AT); Thomas Rotbart, Birkfeld (AT); Johann Kurzweil, St. Peter am Ottersbach (AT)

(73) Assignee: BM-Battery Machines GmbH, Ebersdorf (AT)

( * ) Notice: Subject to any disclaimer, the term of this patent is extended or adjusted under 35 U.S.C. 154(b) by 0 days.

(21) Appl. No.: 09/879,177

(22) Filed: Jun. 13, 2001

(65) Prior Publication Data
US 2002/0020055 A1 Feb. 21, 2002

(30) Foreign Application Priority Data
Jun. 13, 2000 (AT) .............................................. 1020/00

(51) Int. Cl.$^7$ .............................. B23P 19/04; B31F 1/00
(52) U.S. Cl. ........................... 29/564.6; 29/2; 29/623.2; 156/213; 156/227; 156/484
(58) Field of Search .............................. 29/564.6, 564.7, 29/623.1, 623.2, 730, 731, 564.1, 623.3, 2; 156/227, 213, 484, 446; 226/196.1

(56) References Cited

U.S. PATENT DOCUMENTS

| | | | | | |
|---|---|---|---|---|---|
| 3,900,341 A | * | 8/1975 | Shoichiro et al. | ........... | 156/227 |
| 4,026,000 A | * | 5/1977 | Anderson | .................... | 156/484 |
| 4,063,978 A | * | 12/1977 | Badger et al. | .............. | 156/213 |
| 4,271,586 A | * | 6/1981 | McCartney, Jr. | ................. | 29/2 |
| 4,314,403 A | * | 2/1982 | Sanekata | ................. | 226/196.1 |
| 4,402,784 A | * | 9/1983 | Romero-Medrano | ........ | 156/446 |
| 4,407,063 A | * | 10/1983 | Johnson | .................... | 29/623.2 |
| 4,418,464 A | * | 12/1983 | DiGiacomo et al. | ....... | 29/564.1 |
| 5,803,935 A | | 9/1998 | Schwetz et al. | | |

FOREIGN PATENT DOCUMENTS

| | | |
|---|---|---|
| AT | 403 631 B | 4/1998 |
| EP | 0 029 017 B1 | 12/1983 |
| EP | 506645 A1 * | 9/1992 ............... 29/564.6 |

\* cited by examiner

Primary Examiner—William Briggs
(74) Attorney, Agent, or Firm—Young & Thompson

(57) ABSTRACT

The device includes a conveyor element for supplying separator strip in a first plane, a device for cutting sections from the separator strip, another conveyor element for preparing the separator strip sections at one folding site and a unit for supplying plates to be jacketed to the folding site in a second plane perpendicular to the first plane. Next to the plane in which the separator strip section is prepared at the folding site, there is a negatively pressurized roller as the device for tensioning the separator strip section prepared in the folding site. In the area of the folding site on the side of the plane in which a separator strip section is prepared at the folding site which is opposite the side from which the plate to be jacketed is supplied, there is a pair of folding rollers.

13 Claims, 5 Drawing Sheets

DEVICE FOR PRODUCING POCKETS FOR PLATES AND FOR BATTERIES

FIELD OF INVENTION

The invention relates to a device for producing pockets for plants of batteries.

BACKGROUND OF THE INVENTION

A device for producing pockets for plates and for batteries is known from EP 0 029 017 B. In this known device a separator strip section which can be folded around a plate for a battery to form a pocket is pushed through a folding shaft to a folding site. At the folding site a plate to be jacketed is pushed forward transversely to the folding shaft and the separator strip section of the advanced plate is pulled out of a slot in the folding shaft. The arrangement of the plate and the separator strip section folded around the plate which has been moved out of the folding shaft is grasped by a pair of squeezing rollers and supplied to a device for joining the side edges of the folded separator strip section which run transversely to the fold line to form the pocket.

A similar device for producing pockets for battery plates is known from EP 0 506 645 A. In this device too a separator strip section is prepared in a folding shaft at a folding site and by pushing the plate to be jacketed through a slot it is removed from the folding shaft. The arrangement produced in this way consisting of the folded separator strip and the plate located in between is delivered to further processing by two friction roller pairs.

AT 403 631 B discloses a device for conveying and cropping the separator strip, which has negatively pressurized conveyor belts for pushing the separator strip in a folding shaft. From these conveyor belts separator strip sections are prepared in the folding shaft similarly to as in EP 0 029 017 B and EP 0 506 645 A at the folding site. The separator strip section is pulled out of the folding shaft through a slot by a plate which is to be jacketed for a battery, a plate which has be advanced transversely to the strip.

The problem in the known devices which are equipped with a folding shaft is that it is difficult to prepare separator strip sections at the folding site, to which they must be advanced in the folding shaft, especially for thin and less stiff separator strips, and this often leads to malfunctions so that there is the danger that improperly jacketed battery plates will be obtained.

SUMMARY OF THE INVENTION

The object of the invention is to devise a device of the initially mentioned type with which battery plates can be jacketed in separator strip sections even without a folding shaft.

This object is achieved with a device having the features described hereafter.

Preferred and advantageous embodiments of the device are described in detail.

Because in the device of the invention the separator strip sections are not supplied to the folding site in the folding shaft and at the folding site are not prepared in the folding shaft for the folding process, no problems arise with the advance of the separator strip or the separator strip sections through a folding shaft to the folding site. The actual folding process in the device of the invention is likewise without problems, since in the device of the invention it is enough if the separator strip section of the plate to be jacketed which has been moved transversely to the section is moved in the direction to the folding rollers, whereupon it is grasped by the folding rollers and the folding process is carried out without problems. In the device of invention, very thin separator strips can also be processed, since in contrast to the known devices which are equipped with a folding shaft, friction which hinders the actual folding process does not occur, because the separator strip of the plate to be jacketed need not be pushed through a slot in the folding shaft out of the latter.

The aforementioned advantage arises in the device of the invention also in the processing of a stronger/stiffer separator strip since it need not be moved out of the folding shaft through the slot in the folding process.

In particular, in the processing of thin/less stiff/slack separator strip it is preferred when relative to the advance direction of the separator strip after the pair of folding rollers there is a device for tensioning the separator strip section which has been prepared at the folding site, for example, a rotary-driven roller which is supplied with negative pressure. In this way the separator strip section is prepared free of folds and smooth (flat) at the folding site and advantageously supports the actual folding process.

BRIEF DESCRIPTION OF THE DRAWINGS

Other details and advantages of the arrangement of the invention follow from the following description of one preferred embodiment in which reference is made to the drawings.

DETAILED DESCRIPTION OF THE INVENTION

Figure 1:
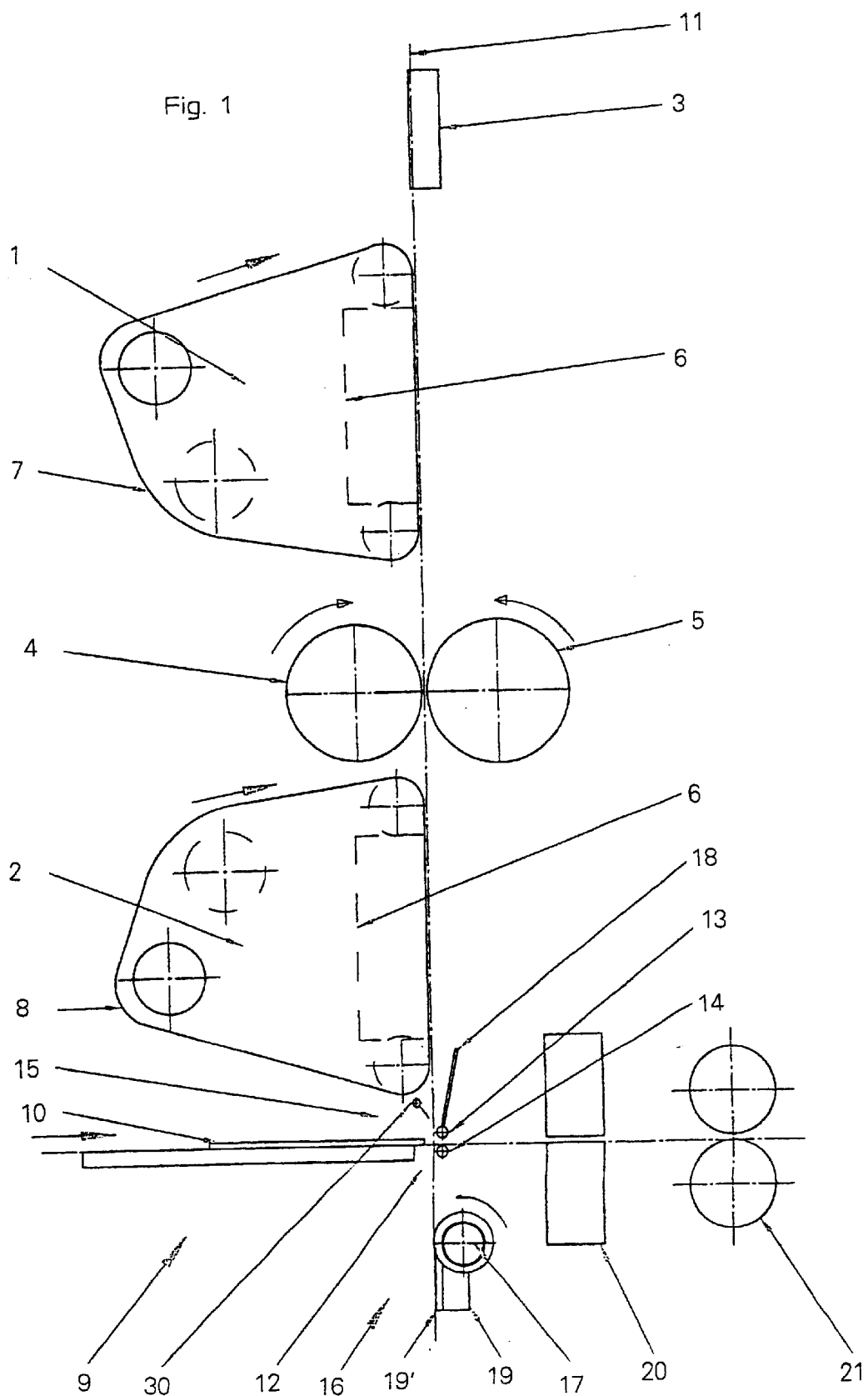
FIG. 1 schematically shows a device of the invention.

The device of the invention which is shown schematically in FIG. 1 has as the conveyor means 1 and 2 for separator strip (coming from a supply spool and supplied from the top in the plane 11) two negatively pressurized continuous conveyor belts, above the top conveyor means 1 there being a guide means 3 which provides for the separator strip of the top conveyor means 1 coming from the supply spool (not shown in FIG. 1) being correctly supplied. Between the two conveyor means 1 and 2 are cutting rollers 4, 5 which with a cutting blade cut the supplied separator strip into separator strip sections with the desired length. In addition, the cutting rollers 4, 5 can also be provided with a notch device (notch strip) in order to pre-fold each separator strip section in its middle.

The conveyor means 1 and 2 can for example have the structure known from AT 403 631 B, its being preferred that instead of the continuous conveyor belts described in AT 403 631 B with holes for the negative pressure to take effect, which pressure is applied via vacuum boxes 6, it has several continuous belts 7 and 8 which are located at a short distance next to one another and which run parallel to one another.

Underneath the lower conveyor means 2 there is a device 9 for supply of the plates 10 to be jacketed for batteries. On the side opposite the feed device 9 for the plates 10, directly next to the plane 11 in which the separator strip or separator strip sections are supplied, there is a pair 12 of folding rollers consisting of two folding rollers 13, 14, of which at least one, preferably the lower roller 14, is rotary driven.

To ensure that the separator strip section which has been prepared at the folding site 15 is correctly aligned relative to the folding roller pair 12 and is correctly grasped by the folding rollers 13 and 14, there can be a nozzle tube 30 essentially opposite the folding roller pair 12. The nozzle tube 30 which is supplied with compressed air preferably at several locations has nozzles pointed obliquely downward. The air jets emerging from the nozzle holes of the nozzle tube 30 load the separator strip section in the direction to the folding roller pair 12 and keep it straight. Thus, "diagonal" grasping of the separator strip section by the folding rollers 13 and 14 is prevented and no "skewed" pockets are formed, therefore pockets with side edges which do not run perpendicular to the fold line.

Underneath the pair 12 of folding rollers, as the device 16 for tensioning the supplied separator strip section which has been prepared at the folding site 15, there is a negatively pressurized roller 17 to which is assigned a rotary drive.

As soon as a separator strip section from the lower conveyor means 2 of the two conveyor means 1, 2 which are supplied with negative pressure has been aligned and prepared at the folding site 15 such that the middle of the separator strip section which has been optionally pre-folded is aligned at the height of the plane in which a plate 10 to be jacketed is supplied, the plate 10 is advanced. By advancing the plate 10 the separator strip section on either side of its middle is placed next to the rollers 13, 14. The separator strip section and the plate 10 are grasped by the folding rollers 13, 14 and the separator strip section is folded around the plate 10 by the folding rollers 13, 14, while the arrangement consisting of the plate 10 and the separator strip section is pulled by the folding rollers 13, 14 (to the right in FIG. 1). In this folding process the two ends of the separator strip section are pulled away by the lower conveyor means 2 and the tensioning roller 17 and continuously placed on either side (from the top and bottom) next to the plate 10, so that ultimately the separator strip section adjoins the plate 10 to be jacketed at the top and bottom. The arrangement which has been produced in this way is supplied to the device 20 for connecting the edges of the separator strip section which are aligned transversely to the folding line, in order to connect the edges of the separator strip section to one another in this device 20. This device can be an ultrasonic welding device or a knurling device of the design described in EP 506 645 A.

The battery plate 10 which has been jacketed in this way is supplied to an optional trimming device 21 in order to trim the edges of the pocket in which the plate 10 for the battery is located. Subsequently the jacketed plate 10 is sent for further processing or production of batteries. For example, stacks of positive and negative battery plates are formed.

Figure 2:
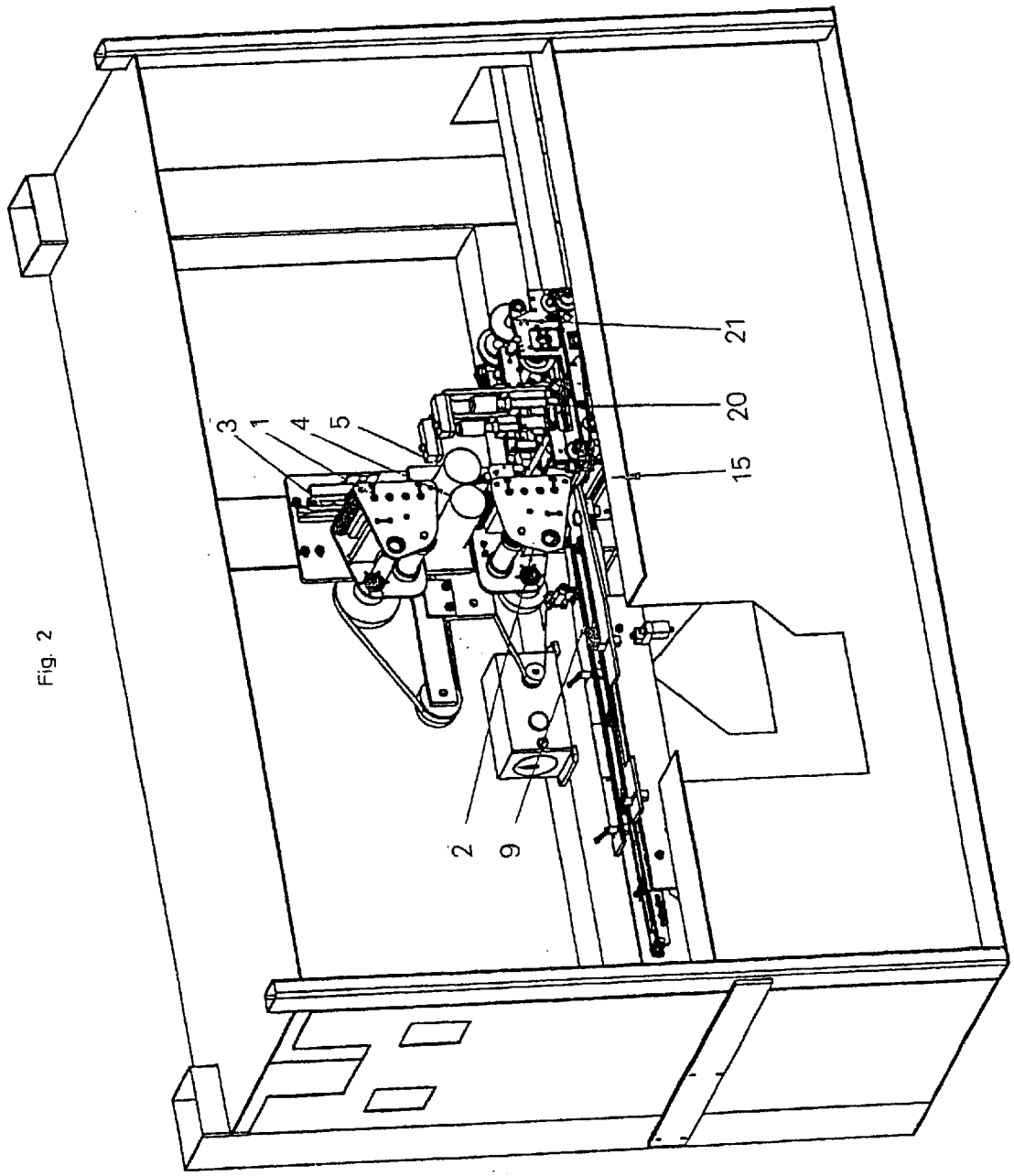
FIG. 2 shows one practical embodiment of the device of the invention (without the supply reel for the separator strip)

FIG. 2 shows one practical embodiment of the device shown in its principle in FIG. 1. The two conveyor means 1 and 2 (the actual conveyor belts 7, 8 are not shown, but simply their deflection rollers), the guide means 3 which is located above the top conveyor means 1, the rotary shears 4, 5 for cutting the separator strip section to the desired length from the supplied separator strip, the second, the negatively pressurized conveyor means 2 which is located underneath the rotary shears 4, 5, and the drives for the synchronous driving of the two conveyor means 1, 2 and the cutting means in the form of rotary shears 4, 5 (rollers equipped with cutting and notching projections) are shown.

Furthermore, in FIG. 2 the supply means 9 for the plates 10 to be jacketed and the folding site 15 with the folding rollers 13, 14 and the tensioning roller 17 are shown, in the same way as the following device 20 made in this example as an ultrasonic welding device for joining the two side edges of the pocket formed in this way, and following it the trimming device 21.

Figure 3:
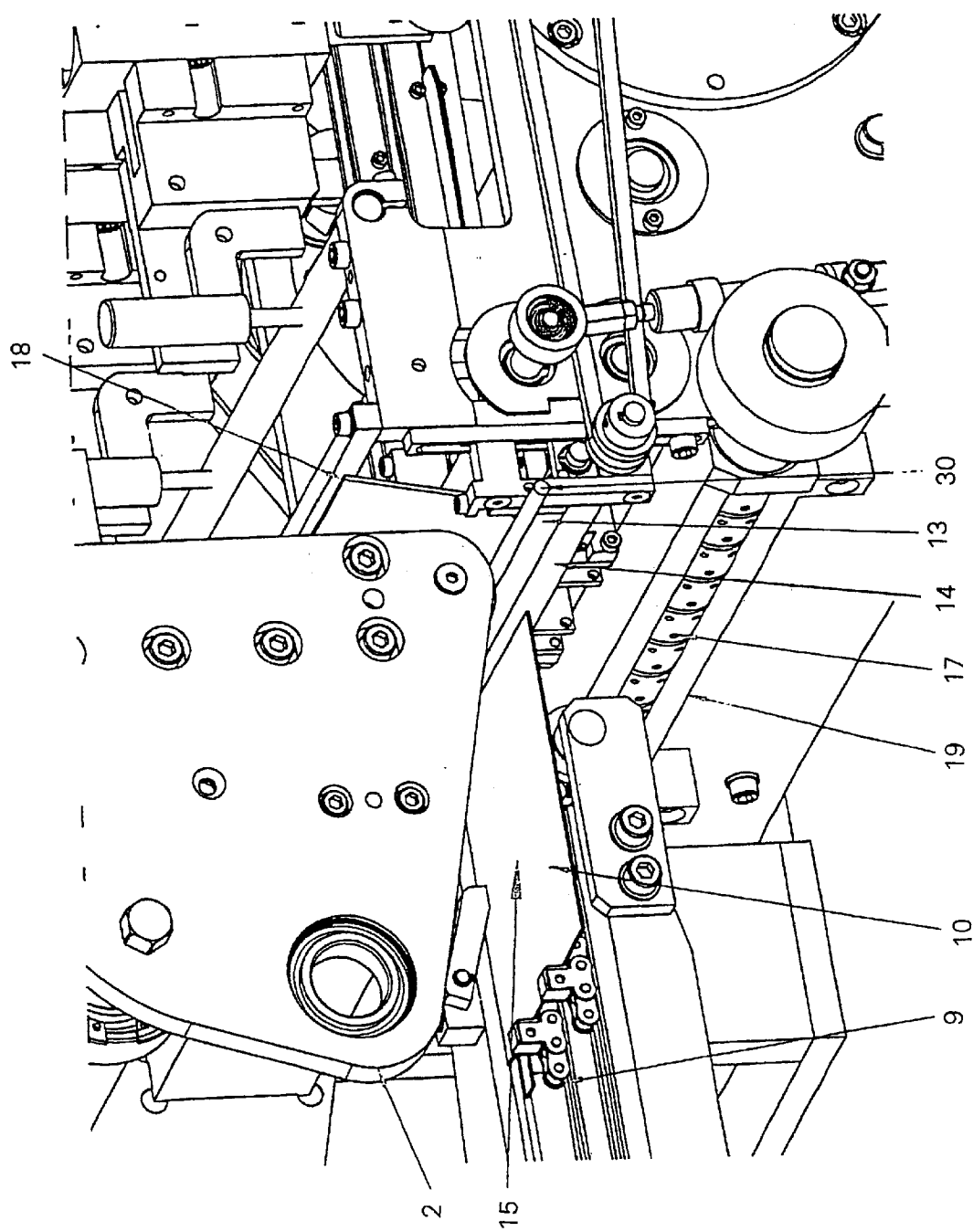
FIG. 3 shows a detail of the device from FIG. 2 in the area of the folding site with the folding rollers and the tensioning device.

FIG. 3 shows on an enlarged scale the folding site 15 with the two folding rollers 13, 14 and guide means located above the folding rollers 13, 14 in the form of a guide sheet 18, and the tensioning roller 17 which is located underneath the folding rollers 13, 14 and which is a negatively pressurized roller 17 which is located in a housing 19. The gap in the housing 19 through which the tensioning roller acts can be equipped with arc-shaped guide rods 22, as shown in FIG. 3.

FIG. 3 also shows the supply device 9 for the plates 10 and a plate 10 located thereon, from which it is apparent that the plates 10 are advanced by the supply device 9 exactly in the gap between the folding rollers 13, 14 when the folding process is to be carried out.

Figure 4:
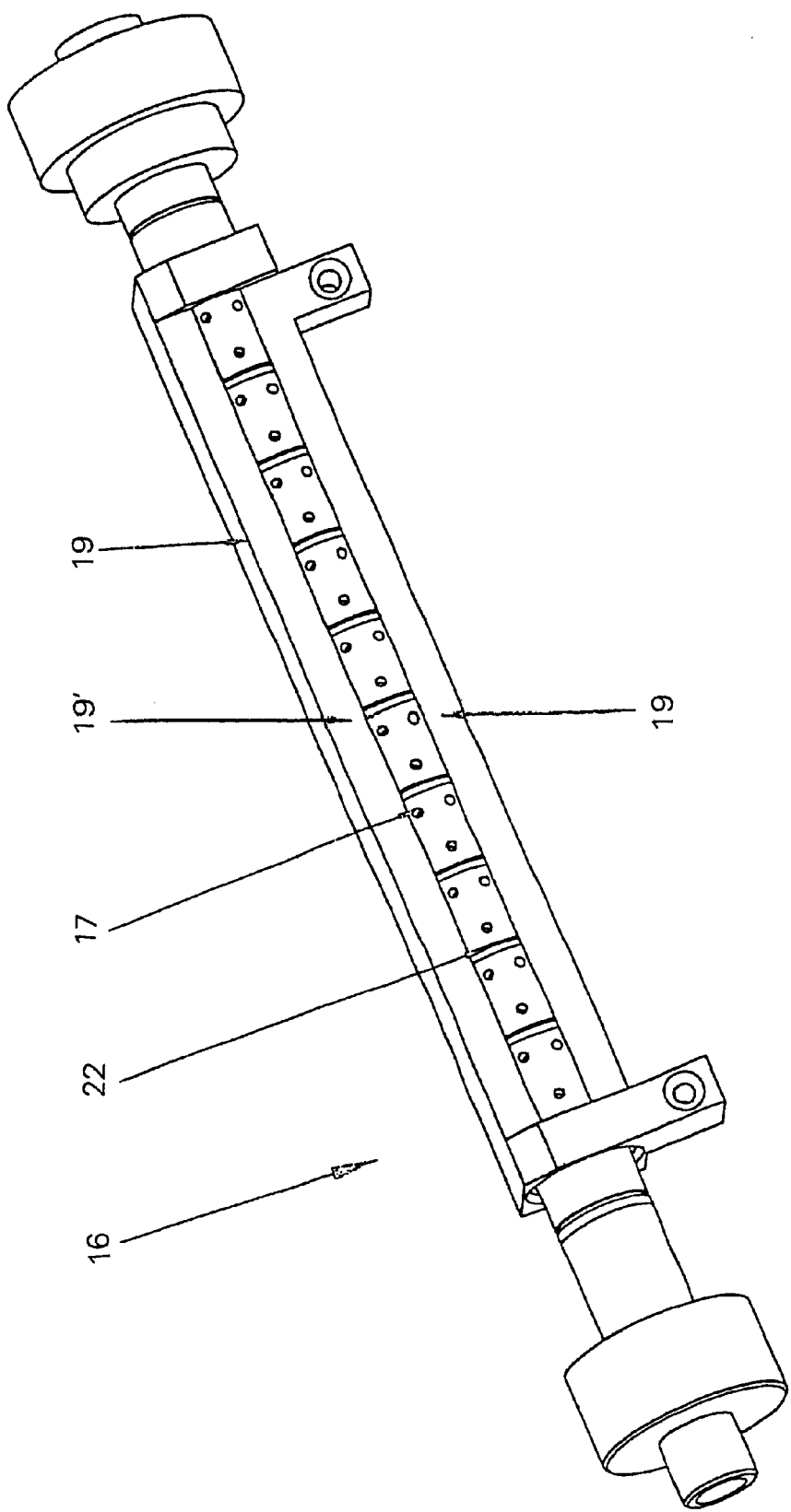
FIG. 4 shows the folding rollers themselves.

FIG. 4 shows the tensioning roller 17 in which is it held, and the housing 19, for itself, with the contact surfaces 19' and the rods 22 which are bent in the embodiment and which bridge the gap of the housing 19 through which the tensioning roller 17 projects.

Figure 5:
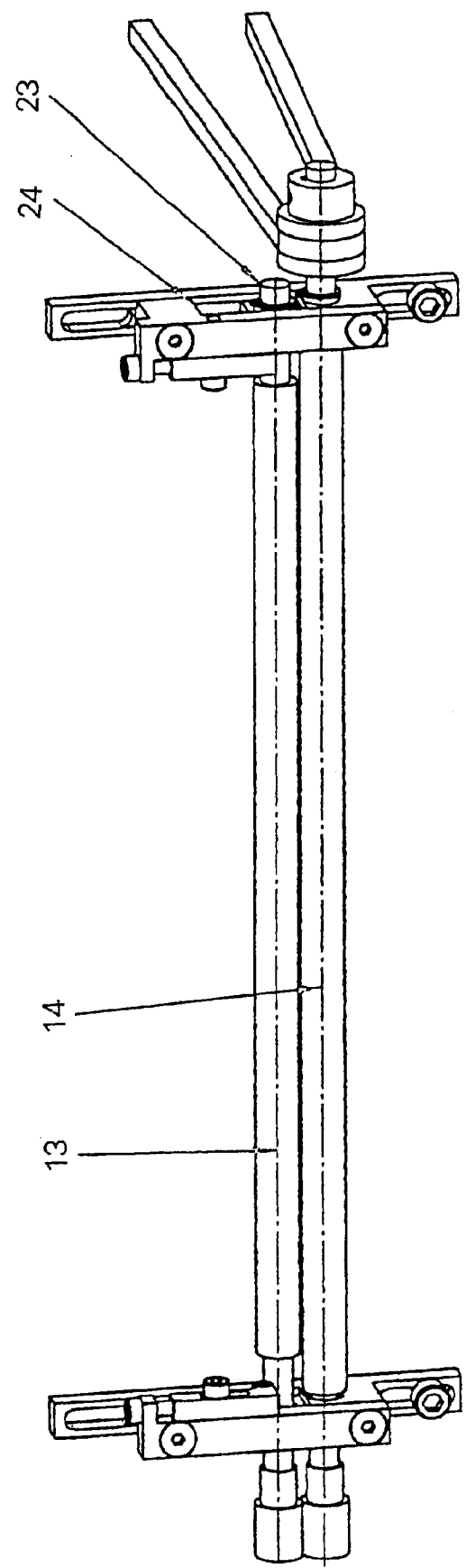
FIG. 5 shows the tensioning rollers themselves.

FIG. 5 shows the folding rollers 13, 14 and the drive which is assigned to the lower 14 of the two folding rollers 13, 14 in the form of a belt drive and the possibility of being able to adjust the distance between the rollers 13, 14, therefore the gap between the rollers 13, 14 to the required amount desired at the time. To do this the upper folding roller 13 is pivotally mounted in adjustable slides 23, the slides being adjustably guided in vertical guides 24 which are mounted on the machine frame.

In summary, one embodiment of the invention can be described as follows:

A device for producing pockets for plates 10 of batteries has a conveyor means 1 for supply of separator strip in a first plane 11, a means 4, 5 for cutting the separator strip sections from the supplied separator strip, another conveyor means 2 for preparing the separator strip sections at one folding site 15 and a means 9 for supply of plates 10 which are to be jacketed to the folding site 15 in a second plane which is perpendicular to the first plane 11. Next to the plane 11 in which the separator strip section is prepared at the folding site 15, with reference to the feed direction of the separator strip section after the folding rollers 13, 14 there is a negatively pressurized roller 17 as the device 16 for tensioning the separator strip section which is prepared in the folding site 15. In the area of the folding site 15, on the side of the plane 11 in which a separator strip section is prepared at the folding site 15 which is opposite the side from which the plate 10 to be jacketed is supplied, there is a pair of folding rollers 13, 14, by which the separator strip section and the plate 10 to be jacketed are grasped and pulled away, the separator strip section being folded and being placed next to the plate 10 to be jacketed from both sides.

What is claimed is:

1. A device for producing pockets for plates of batteries with a conveyor means for supply of separator strip in a first plane, with a means for cutting the separator strip sections from the supplied separator strip, with a conveyor means for preparing the separator strip sections at one folding site and a means for supply of plates which are to be jacketed to the folding site in a second plane which is perpendicular to the first plane, characterized in that in the area of the folding site on the side of the first plane in which a separator strip section is prepared at the folding site which is opposite the side from which the plate to be jacketed is supplied, there is a pair of folding rollers which can turn around axles which are parallel to one another, of which at least one is rotary-driven, wherein next to the first plane in which the separator strip section is prepared at the folding site, with reference to the feed direction of the separator strip section after the folding rollers there is a device for tensioning the separator strip section which is prepared in the folding site, and wherein the device for tensioning the separator strip section has a rotating, negatively pressurized roller.

2. The device as claimed in claim 1, wherein the roller is located in a housing which has contact surfaces for the separator strip section.

3. The device as claimed in claim 1, wherein the means for cutting the separator strip sections is located between the conveyor means for supplying the separator strip and the conveyor means for preparing the separator strip at the folding site.

4. The device as claimed in claim 1, wherein the means for cutting the separator strip sections has two pivotally mounted rollers with at least one cutting blade.

5. The device as claimed in claim 4, wherein each of the rollers of the means for cutting the separator strip sections is equipped with a notch strip for pre-folding of a separator strip section.

6. The device as claimed in claim 2, wherein the gap through which the tensioning roller projects out of the housing is bridged by rods which are located at a distance from one another and which run essentially in the conveyor direction.

7. The device as claimed in claim 1, wherein the conveyor means for supplying the separator strip and the conveyor means for preparing the separator strip sections have negatively pressurized continuous conveyor elements, the continuous conveyor elements being continuous belts which run parallel to one another and which are arranged at a distance from one another, the negative pressure being applied via the gap between the continuous conveyor elements.

8. The device as claimed in claim 1, wherein above the folding rollers is a plate-shaped guide means.

9. The device as claimed in claim 1, wherein the distance between the folding rollers is adjustable.

10. The device as claimed in one of claim 1, wherein the lower of the folding rollers is coupled to a rotary drive.

11. The device as claimed in claim 1, wherein the upper folding roller is adjustably supported in the machine frame.

12. The device as claimed in claim 1, wherein opposite the folding roller pair is a nozzle tube which is supplied with compressed air.

13. The device as claimed in claim 12, wherein the axes of the nozzle holes of the nozzle tube run obliquely downward.

* * * * *